(12) United States Patent
Evans et al.

(10) Patent No.: US 11,683,397 B2
(45) Date of Patent: *Jun. 20, 2023

(54) HIERARCHICAL DATA EXCHANGE MANAGEMENT SYSTEM

(71) Applicant: General Electric Company, Schenectady, NY (US)

(72) Inventors: Scott Charles Evans, Burnt Hills, NY (US); Benjamin Edward Beckmann, Niskayuna, NY (US); John William Carbone, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,342

(22) Filed: Apr. 22, 2022

(65) Prior Publication Data
US 2022/0256013 A1    Aug. 11, 2022

Related U.S. Application Data

(63) Continuation of application No. 17/167,854, filed on Feb. 4, 2021, now Pat. No. 11,323,544, which is a
(Continued)

(51) Int. Cl.
*H04L 67/63* (2022.01)
*G06F 21/62* (2013.01)
(Continued)

(52) U.S. Cl.
CPC .......... *H04L 67/63* (2022.05); *G06F 21/6245* (2013.01); *G06Q 30/0201* (2013.01);
(Continued)

(58) Field of Classification Search
CPC ....... H04L 67/63; H04L 67/53; H04L 67/306; G06F 21/6245
See application file for complete search history.

(56) References Cited

U.S. PATENT DOCUMENTS 7,197,502 B2 *  3/2007  Feinsmith .............. G06Q 30/06
                                                707/999.009
8,175,895 B2 *  5/2012  Rosenfeld .............. A61B 5/002
                                                600/300
(Continued)

FOREIGN PATENT DOCUMENTS

CN         103329129 A      9/2013
CN         104380690 A      2/2015
(Continued)

OTHER PUBLICATIONS

Kumar, Vimal et al.; "Secure Hierarchical Data Aggregation in Wireless Sensor Networks: Performance Evaluation and Analysis"; 2012 IEEE 13th International Conference on Mobile Data Management, Bengaluru, 2012, pp. 196-201.
(Continued)

*Primary Examiner* — Jimmy H Tran
(74) *Attorney, Agent, or Firm* — Jean K. Testa; Fletcher Yoder, P.C.

(57) ABSTRACT

According to some embodiments, a system to facilitate hierarchical data exchange may include an aggregation platform data store containing electronic records. A data aggregation platform may collect, from a plurality of data source devices, information associated with a plurality of data sources and store the collected information into the aggregation platform data store. The data aggregation platform may also receive a data request from a data consumer device, and, responsive to the received data request, determine a precision tier associated with the data request. The data aggregation platform may then automatically calculate a resource value for the data request based on the precision tier. It may then be arranged for information from the aggregation platform data store to be modified and transmitted to the data consumer device.

20 Claims, 15 Drawing Sheets

Related U.S. Application Data continuation of application No. 15/812,003, filed on Nov. 14, 2017, now Pat. No. 10,938,950.

(51) Int. Cl.
| | |
|---|---|
| *G06Q 30/0201* | (2023.01) |
| *H04L 9/32* | (2006.01) |
| *H04L 67/53* | (2022.01) |
| *H04L 67/50* | (2022.01) |
| *H04L 67/565* | (2022.01) |
| *H04L 67/306* | (2022.01) |
| *H04L 9/00* | (2022.01) |

(52) U.S. Cl.
CPC ............ *H04L 9/3239* (2013.01); *H04L 67/53* (2022.05); *H04L 67/535* (2022.05); *H04L 67/565* (2022.05); *H04L 9/50* (2022.05); *H04L 67/306* (2013.01)

(56) References Cited

U.S. PATENT DOCUMENTS

| | | | | |
|---|---|---|---|---|
| 8,321,556 | B1* | 11/2012 | Chatterjee | H04H 60/31 707/804 |
| 8,495,007 | B2* | 7/2013 | Williamson | G06F 16/283 707/756 |
| 9,582,642 | B2* | 2/2017 | Keen | H04L 67/12 |
| 9,690,538 | B1* | 6/2017 | Doyle, III | H04W 4/023 |
| 10,003,591 | B2* | 6/2018 | Hockey | H04L 9/3228 |
| 10,078,624 | B2 | 9/2018 | Nalchadzhe | |
| 10,347,374 | B2* | 7/2019 | Tribble | G16Z 99/00 |
| 10,438,686 | B2* | 10/2019 | Yao | G16B 5/20 |
| 10,646,405 | B2* | 5/2020 | Ranalletta | F21V 9/14 |
| 10,818,387 | B2* | 10/2020 | Bossio | G16H 15/00 |
| 10,971,257 | B2* | 4/2021 | Weber | G16Z 99/00 |
| 11,107,574 | B2* | 8/2021 | Padmani | G16H 10/00 |
| 11,521,714 | B1* | 12/2022 | Jain | G06F 40/289 |
| 11,527,316 | B2* | 12/2022 | Crowley | A61B 5/681 |
| 2003/0167079 | A1* | 9/2003 | Birnbaum | G16H 20/30 600/509 |
| 2003/0187688 | A1* | 10/2003 | Fey | G16H 10/60 705/2 |
| 2007/0239741 | A1 | 10/2007 | Jordahl | |
| 2008/0104012 | A1* | 5/2008 | Nolan | G06Q 30/02 |
| 2008/0294018 | A1* | 11/2008 | Kurtz | G16H 10/60 600/301 |
| 2009/0069720 | A1* | 3/2009 | Beck | A61B 5/4866 600/587 |
| 2009/0132395 | A1* | 5/2009 | Lam | G06F 16/9535 705/30 |
| 2009/0326981 | A1* | 12/2009 | Karkanias | G16H 40/63 705/3 |
| 2010/0169108 | A1* | 7/2010 | Karkanias | G16H 50/20 705/2 |
| 2011/0307311 | A1* | 12/2011 | Turgiss | G16H 40/67 705/14.4 |
| 2012/0235821 | A1* | 9/2012 | DiBenedetto | A61B 5/024 340/573.1 |
| 2014/0229349 | A1* | 8/2014 | Yanev | G16H 20/30 705/37 |
| 2014/0245161 | A1* | 8/2014 | Yuen | A61B 5/6838 715/736 |
| 2015/0154646 | A1 | 6/2015 | Mishra et al. | |
| 2015/0242890 | A1* | 8/2015 | Bass | H04W 4/02 705/14.5 |
| 2015/0347784 | A1* | 12/2015 | Keen | G06F 21/6245 726/28 |
| 2015/0379510 | A1* | 12/2015 | Smith | G06Q 20/3829 705/71 |
| 2016/0004820 | A1* | 1/2016 | Moore | G16H 15/00 705/3 |
| 2016/0034696 | A1* | 2/2016 | Jooste | G06F 1/163 726/1 |
| 2016/0224996 | A1* | 8/2016 | Hunt | G06F 16/283 |
| 2016/0232318 | A1* | 8/2016 | Mensinger | G06F 21/62 |
| 2016/0321403 | A1* | 11/2016 | Wang | G16H 50/20 |
| 2016/0321654 | A1* | 11/2016 | Lesavich | H04L 67/104 |
| 2016/0324432 | A1* | 11/2016 | Ahmed | A61B 5/0255 |
| 2017/0006412 | A1* | 1/2017 | Dow | H04L 67/535 |
| 2017/0031449 | A1* | 2/2017 | Karsten | G06F 1/163 |
| 2017/0032401 | A1 | 2/2017 | Shifman | |
| 2017/0039330 | A1* | 2/2017 | Tanner, Jr. | G06Q 20/065 |
| 2017/0039336 | A1* | 2/2017 | Bitran | G16H 20/70 |
| 2017/0053015 | A1* | 2/2017 | Liongosari | G06F 16/24575 |
| 2017/0054611 | A1* | 2/2017 | Tiell | G06Q 30/0631 |
| 2017/0071487 | A1* | 3/2017 | Ritscher | A61B 5/316 |
| 2017/0091397 | A1* | 3/2017 | Shah | H04L 63/20 |
| 2017/0140141 | A1* | 5/2017 | Yan | G06F 21/32 |
| 2017/0169800 | A1* | 6/2017 | Greco | G06F 3/04845 |
| 2017/0213209 | A1* | 7/2017 | Dillenberger | G06Q 20/3829 |
| 2017/0243241 | A1* | 8/2017 | Boutelle | G06Q 30/0229 |
| 2017/0262654 | A1* | 9/2017 | Wouhaybi | H04W 12/02 |
| 2017/0293772 | A1* | 10/2017 | Chen | G06F 21/6227 |
| 2017/0308671 | A1* | 10/2017 | Bahrami | G16H 10/60 |
| 2017/0330438 | A1* | 11/2017 | Howard | A61B 5/681 |
| 2017/0364637 | A1* | 12/2017 | Kshepakaran | G16H 10/60 |
| 2017/0367634 | A1* | 12/2017 | Wouhaybi | H04W 4/029 |
| 2018/0046766 | A1* | 2/2018 | Deonarine | H04L 9/0643 |
| 2018/0078843 | A1* | 3/2018 | Tran | G09B 19/0038 |
| 2018/0117446 | A1* | 5/2018 | Tran | A42B 3/0433 |
| 2018/0144101 | A1* | 5/2018 | Bitran | G16H 50/20 |
| 2018/0203926 | A1* | 7/2018 | Phan | G06Q 10/10 |
| 2018/0211059 | A1* | 7/2018 | Aunger | G06F 21/6263 |
| 2018/0232464 | A1* | 8/2018 | Looney | G06F 16/22 |
| 2018/0261307 | A1* | 9/2018 | Couse | G16H 80/00 |
| 2018/0263512 | A1* | 9/2018 | Aittokoski | A61B 5/6891 |
| 2018/0303381 | A1* | 10/2018 | Todd | A61B 5/1118 |
| 2018/0344215 | A1* | 12/2018 | Ohnemus | A61B 5/1118 |
| 2018/0350451 | A1* | 12/2018 | Ohnemus | H04L 67/535 |
| 2019/0012466 | A1* | 1/2019 | Ricotta | H04L 63/102 |
| 2019/0265971 | A1* | 8/2019 | Behzadi | G06F 16/288 |
| 2019/0332807 | A1* | 10/2019 | LaFever | G06F 21/6254 |
| 2020/0005347 | A1* | 1/2020 | Boal | G06Q 30/0211 |
| 2020/0237262 | A1* | 7/2020 | Todd | A61B 5/7267 |
| 2021/0210188 | A1* | 7/2021 | Ahmed | A63B 24/0062 |
| 2022/0050921 | A1* | 2/2022 | LaFever | H04L 63/0407 |

FOREIGN PATENT DOCUMENTS

| | | |
|---|---|---|
| JP | 2002329126 A | 11/2002 |
| JP | 2005031965 A | 2/2005 |
| JP | 2013003763 A | 1/2013 |
| JP | 2014229039 A | 12/2014 |
| JP | 2015103111 A | 6/2015 |
| WO | 2016103055 A1 | 6/2016 |
| WO | 2017090329 A1 | 6/2017 |

OTHER PUBLICATIONS

Stanciu, Alexandru; "Blockchain Based Distributed Control System for Edge Computing", 2017 21st International Conference on Control Systems and Computer Science (CSCS), Bucharest, 2017, pp. 667-671.

Chinese First Office Action; CN Application No. 201880073502.3; dated Dec. 15, 2022.

Japanese First Office Action; JP Application No. 2020-526118; dated Dec. 14, 2022.

* cited by examiner

600 ↘

| PRECISION TIER IDENTIFIER 602 | PRECISION TIER DESCRIPTION 604 | RESOURCE VALUE 606 |
|---|---|---|
| PRE_T_01 | HOURLY HEART RATE | 25.00 |
| PRE_T_02 | DAILY AVERAGE HEART RATE | 5.00 |
| PRE_T_03 | WEEKLY AVERAGE HEART RATE | 1.80 |
| PRE_T_04 | OVERALL LIFETIME AVERAGE HEART RATE | 1.20 |

| PRIVACY TIER IDENTIFIER 702 | PRIVACY TIER DESCRIPTION 704 | RESOURCE VALUE 706 |
|---|---|---|
| PRI_T_01 | EXACT NAME/SSN | 10.00 |
| PRI_T_02 | HEART CONDITION INDICATION | 5.00 |
| PRI_T_03 | AGE BAND OR BIRTHDAY | 3.00 |
| PRI_T_04 | LOCATION | 0.50 |
| PRI_T_05 | GENDER | 0.40 |
| PRI_T_06 | NO INFORMATION | 0.30 |

FIG. 7

| PRIVACY TIER IDENTIFIER 802 | PRIVACY TIER DESCRIPTION 804 | HOURLY HEART RATE | DAILY AVERAGE HEART RATE | WEEKLY AVERAGE HEART RATE | OVERALL LIFETIME AVERAGE HEART RATE |
|---|---|---|---|---|---|
| | | RESOURCE VALUES 806 | | | |
| PRI_T_01 | EXACT NAME/SSN | 95.00 | 50.00 | 25.00 | 5.00 |
| PRI_T_02 | HEART CONDITION INDICATION | 70.00 | 40.00 | 12.70 | 3.50 |
| PRI_T_03 | AGE BAND OR BIRTHDAY | 30.00 | 22.00 | 10.00 | 2.15 |
| PRI_T_04 | LOCATION | 4.50 | 3.00 | 2.00 | 0.75 |
| PRI_T_05 | GENDER | 2.00 | 1.75 | 1.00 | 0.50 |
| PRI_T_06 | NO INFORMATION | 1.00 | .70 | .50 | 0.10 |

*FIG. 8*

HIERARCHICAL DATA EXCHANGE MANAGEMENT SYSTEM

CROSS-REFERENCE TO RELATED APPLICATION

This application is a continuation of U.S. application Ser. No. 17/167,854, entitled "HIERARCHICAL DATA EXCHANGE MANAGEMENT SYSTEM," filed on Feb. 4, 2021, now U.S. Pat. No. 11,323,544 which issued on May 5, 2022, which is a continuation of U.S. patent application Ser. No. 15/812,003, entitled "HIERARCHICAL DATA EXCHANGE MANAGEMENT SYSTEM", filed Nov. 14, 2017, now U.S. Pat. No. 10,938,950 which issued on Mar. 2, 2021, both of which are herein incorporated by reference in their entireties.

BACKGROUND

Some embodiments disclosed herein relate to a data management system and, more particularly, to systems and methods implementing or using a hierarchical data exchange management system.

One or more data consumers may be interested in obtaining information from data sources. For example, people wearing fitness activity monitors may generate medical information, such as an hourly heart rate, that might be of interest to researchers. Moreover, different people may have different preferences and/or willingness to share this type of information. Further note that some types of information may be more valuable to data consumers as compared to other types of information. For example, knowing that a person has a particular heart condition might be of interest to a researcher. In general, people may be willing to share more specific and/or more personal information in exchange for higher levels of compensation. It can be difficult, however, to fairly and accurately arrange for different parties to provide and/or receive different types of information in exchange for different types of benefits—especially with a substantial number of people and/or a large number of transactions (e.g., tens of thousands of transactions), and the process can be both time consuming and costly. It may therefore be desirable to achieve improved and computerized ways to efficiently and accurately facilitate management of a hierarchical data exchange.

SUMMARY

According to some embodiments, a system to facilitate hierarchical data exchange may include an aggregation platform data store containing electronic records. A data aggregation platform may collect, from a plurality of data source devices, information associated with a plurality of data sources and store the collected information into the aggregation platform data store. The data aggregation platform may also receive a data request from a data consumer device, and, responsive to the received data request, determine a precision tier associated with the data request. The data aggregation platform may then automatically calculate a resource value for the data request based on the precision tier. It may then be arranged for information from the aggregation platform data store to be modified and transmitted to the data consumer device.

Some embodiments comprise: means for collecting, from a plurality of data source devices, information associated with a plurality of data sources; means for storing, at an aggregation platform data store, electronic records representing the collected information; means for receiving, at a data aggregation computer processor, a data request from a data consumer device; responsive to the received data request, means for determining a precision tier associated with the data request; responsive to the received data request, means for determining a privacy tier associated with the data request; means for automatically calculating a resource value for the data request based on the precision tier and the privacy tier; means for arranging for information from the aggregation platform data store to be modified and transmitted to the data consumer device; means for arranging for at least a portion of the resource value to be provided to at least one data source; and means for recording information associated with the data request via a secure, distributed transaction ledger.

Technical effects of some embodiments of the invention are improved and computerized ways to efficiently and accurately facilitate management of a hierarchical data exchange. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 is a portion of a precision tier database in accordance with some embodiments.

FIG. 7 is a portion of a privacy tier database according to some embodiments.

FIG. 8 is a portion of a resource values database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
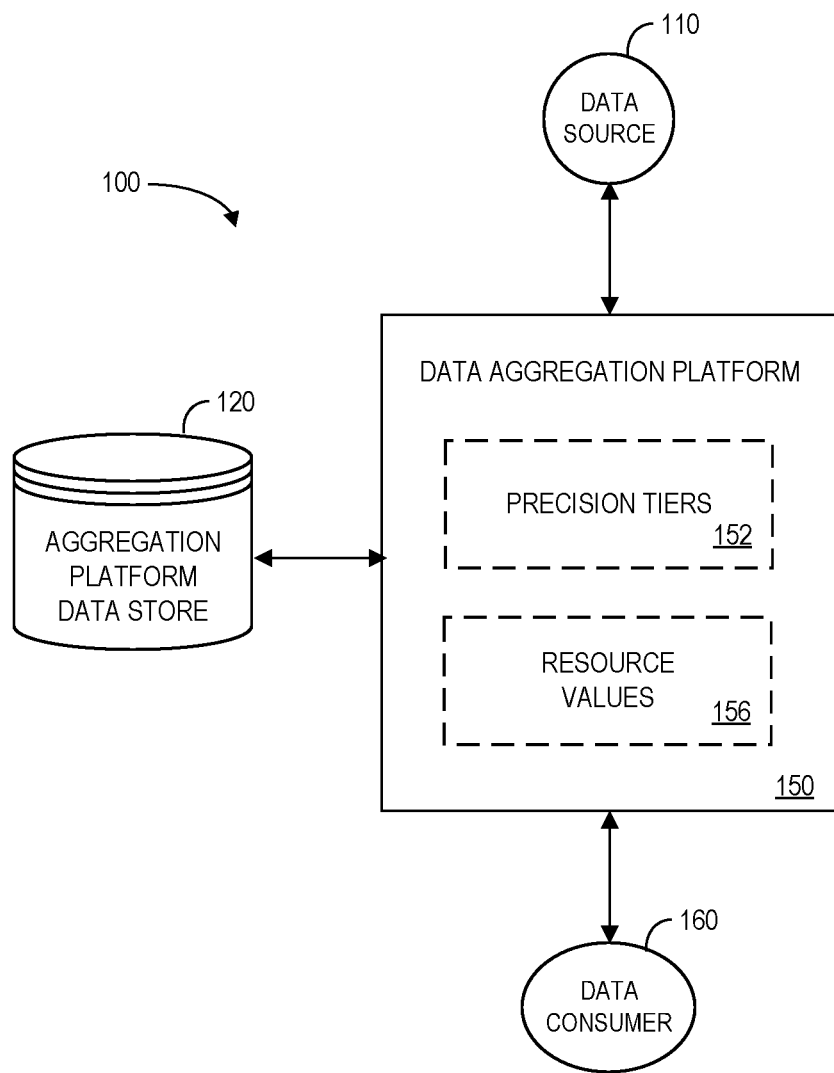
FIG. 1 is a high-level diagram of a system according to some embodiments.

It may therefore be desirable to achieve improved and computerized ways to efficiently and accurately facilitate a hierarchical data exchange. For example, FIG. 1 is a high-level diagram of a system 100 according to some embodiments. The system 100 includes an automated data aggregation platform 150 that communicates with one or more data sources 110 and one or more data consumers 160. By way of example only, the data sources 110 might comprise consumers who wear health monitoring devices and the data consumers 160 might comprise devices associated with medical researchers or insurance companies who are interested in the data generated by the health monitoring devices. According to some embodiments, the automated data aggregation platform 150 can access an aggregation platform data store 120 that includes electronic records reflecting information provided by the data sources 110. Note that the automated data aggregation platform 150 could be completely de-centralized and/or might be associated with a third party, such as a vendor that performs a service for an enterprise. Also note that although the data aggregation platform data store 120 is illustrated in FIG. 1, any of the embodiments described herein might be configured such that data sources 110 instead transmit information directly to data consumers 160.

The automated data aggregation platform 150 and/or other elements of the system 100 might be, for example, associated with a Personal Computer ("PC"), laptop computer, a tablet computer, a smartphone, an enterprise server, a server farm, and/or a database or similar storage devices. According to some embodiments, an "automated" data aggregation platform 150 may automatically manage a hierarchical data exchange. As used herein, the term "automated" may refer to, for example, actions that can be performed with little (or no) intervention by a human.

As used herein, devices, including those associated with the automated data aggregation platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The automated data aggregation platform 150 may store information into and/or retrieve information from data stores, including the aggregation platform data store 120. The data stores might, for example, store electronic records representing consumer health data, demographic information, etc. The data stores may be locally stored or reside remote from the automated data aggregation platform 150. Although a single automated data aggregation platform 150 is shown in FIG. 1, any number of such devices may be included. Moreover, various devices described herein might be combined according to embodiments of the present invention. For example, in some embodiments, the automated data aggregation platform 150, aggregation platform data store 120, and/or other devices might be co-located and/or may comprise a single apparatus.

According to some embodiments, the data aggregation platform 150 may arrange for information from data sources 110 to be stored in the aggregation platform data store 120. The data aggregation platform 150 may then receive a data request from a data consumer 160. In accordance with some embodiments, the data aggregation platform 150 may access precision tiers 152 and resource values 156 when responding to the request. For example, a data consumer 160 might arrange to provide a higher value (e.g., a higher benefit or a higher monetary value or other store of value) to the data aggregation platform 1500 in exchange for access to more precise information about the data sources 110 as compared to less precise information. The data aggregation platform 150 may then modify information in the aggregation platform data store 120 (e.g., by filtering data, taking average values, etc.) and provide the modified information to the data consumer 160.

Figure 2:
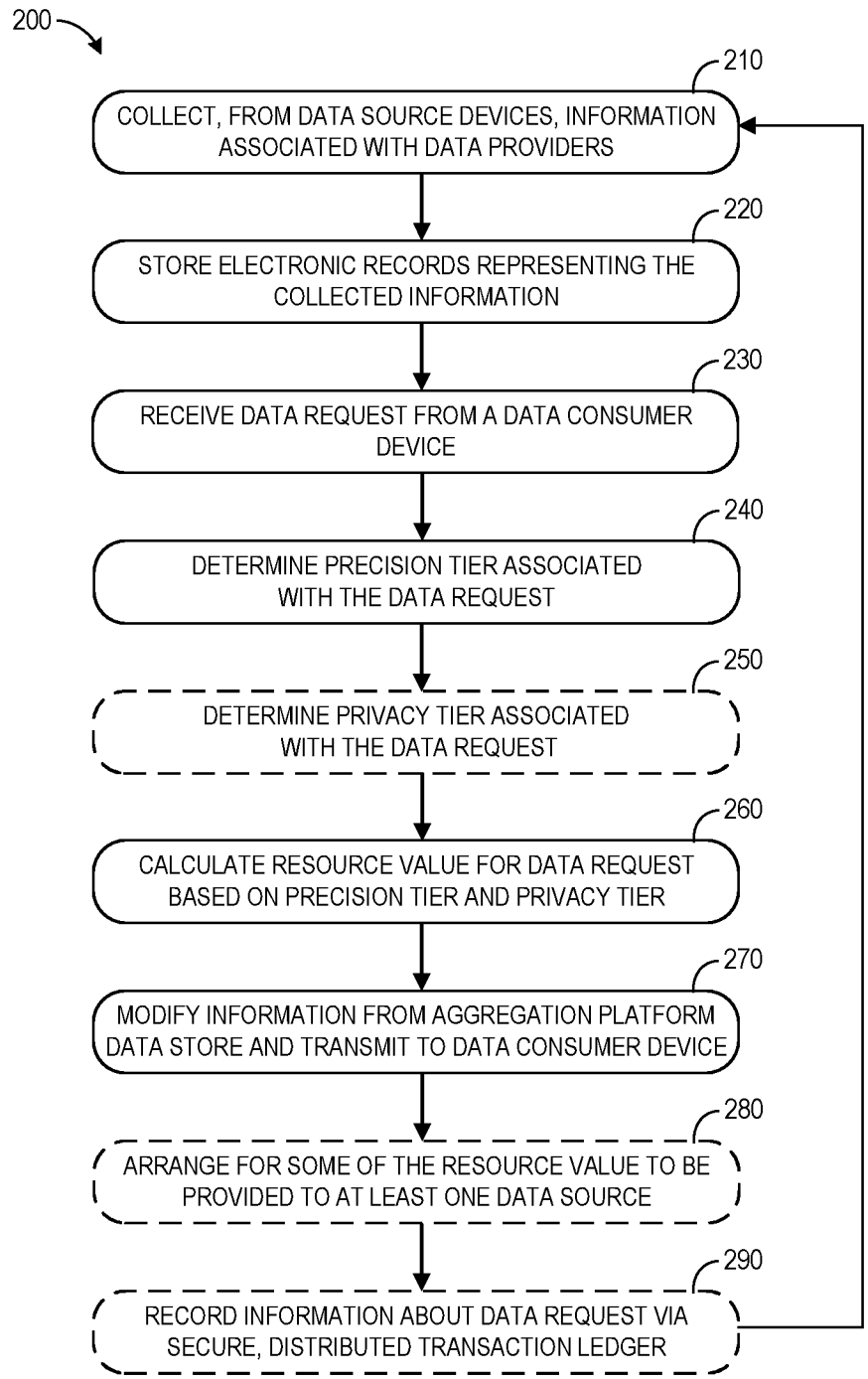
FIG. 2 is a method in accordance with some embodiments.

In this way, the system 100 may efficiently and accurately facilitate management of a hierarchical data exchange. Note that the system 100 of FIG. 1 is provided only as an example, and embodiments may be associated with additional elements or components. For example, FIG. 2 illustrates a method 200 that might be performed according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, the system may collect, from a plurality of data source devices, information associated with a plurality of data sources. As used herein, the phrase "data source" might refer to an individual, a family, an enterprise, a business, or any other entity capable of providing data. At 220, the system may store, at an aggregation platform data store, electronic records representing the collected information. By way of example, the collected information might be associated with health data such as heart rate data, activity data, sleep data, blood pressure data, glucose monitoring data, insulin data, etc.

Note that embodiments do not need to be associated with health data. For example, the information collected from data sources (e.g., individuals) might include media consumption data such as television data (e.g., which channels or programs an individual watches), online data (e.g., what web sites does he or she visit), application data (e.g., which smartphone apps or video games does an individual access), streaming data (e.g., what movies or television shows does he or she watch), advertising data, etc. The collected information could also include communication data such as telephone communication data (e.g., who does the person call and how often), email communication data, social network communication data, real world proximity data (e.g., what people or groups does he or she spend time interacting with in the real world), etc. As still other examples, the collected information might include demographic data (e.g., age, gender, home address, etc.), psychographic data (e.g., hobbies, mood, income, etc.), location data, telematic data associated with driving habits, survey data, genetic data, credit score data, spending data, credit card data, bank account data, etc. When the data sources are businesses or similar entities, the collected information might include sales data, profit data, employee data, debt data, etc. According to some embodiments, data collected in connection with a business might include information about an industrial asset item (e.g., a wind turbine, a gas turbine, etc.), a "digital twin" that models operation of a physical industrial asset item, an additive manufacturing process, etc.

At 230, a data aggregation computer processor may receive a data request from a data consumer device. As used herein, the phrase "data consumer" might refer to an enterprise, a business, an individual, or any other entity interested in receiving data generated by data sources. Examples of data consumers might include a researcher, an insurer, an advertiser, a governmental entity, an educational entity, etc. Note that a data aggregation platform might be implemented via a single network cloud-hosted topology, a multiple network cloud-hosted topology, a participant hosted intranet environment, etc.

At 240, responsive to the received data request, the system may determine a "precision tier" associated with the data request. As used herein, the phrase "precision tier" may refer to various levels of precision associated with the data. For example, some types of granularity associated with precision tiers might be associated with a complete data set (e.g., a person's heart rate as measured once per hour by an activity tracking device), an average of multiple data items associated with a data source (e.g., a person's average heart rate during a particular week), an average of multiple data items associated with multiple data sources (e.g., the average heart rate of all women between the ages of 40 and 45), data items sharing at least one characteristic specified in the data request (e.g., the average heart rate of all people who have pacemakers), etc.

At 250, responsive to the received data request, the system may determine a "privacy tier" associated with the data request. As used herein, the phrase "privacy tier" may refer to various levels of specificity associated with identifying a particular person or entity as being the data source. Examples of this type of information include a personal identifier (e.g., a Social Security Number ("SSN")), a name, a health condition, an age band (e.g., from 25 to 35 years old), a birthday, a location, an address (e.g., a home address or a communication address such as an email), a gender, etc. In some cases, the privacy tier might be associated with complete anonymity (i.e., no personal data may be provided at all). Note that not all steps illustrated in FIG. 2 might be performed in accordance with some embodiments of the present invention (e.g., as illustrated by dashed lines around some steps).

At 260, the system may then automatically calculate a "resource value" for the data request based on the precision tier and, in embodiments that have a privacy tier, the privacy tier. As used herein, the phrase "resource value" might refer to any type of benefit that is provided to data sources in exchange for sharing information. Note that data sources may receive higher compensation in exchange for sharing more specific and/or more private data. For example, if a person's hourly heart rate was transmitted to a researcher along with his or her name the amount of compensation might be much greater as compared to having that same information being used to determine an average heart rate for all 25-year-old men (in which case, all 25-year-old men might each receive a much smaller amount of compensation). Examples of different types of resource values include an online payment, a micropayment, a credit account payment, a debit account payment, a bank transfer, a cryptocurrency and digital payment system, etc. According to some embodiments, a non-monetary benefit might be provided to a data source, such as access to data (e.g., the ability to watch a movie) or an amount of points to be subsequently redeemed by the data source (e.g., frequent flier miles).

At 270, the system may arrange for information from the aggregation platform data store to be modified and transmitted to the data consumer device. The types of modifications that might be performed on the information from the aggregation platform data store include data aggregation, averaging multiple data items associated with a single data source, averaging multiple data items associated with multiple data sources, combining information from multiple data source devices each associated with a single data source, removing information (e.g., de-personalization), supplementing information with third-party data (e.g., appending a person's credit score to a data file), data translation (e.g., from one format or protocol to another), etc. At 280, the system may then arrange for least a portion of the resource value to be provided to at least one data source. That is, the data source may be compensated in exchange for having the data consumer receive his or her information via the data aggregation platform.

At 290, the system may record information associated with the data request via a secure, distributed transaction ledger. For example, details about the transaction may be recorded in a transaction ledger associated with blockchain technology. The recorded information might include for example, data request information, data source information, payment information, data integrity information, precision information, privacy information, resource value information, indications of data availability, etc.

Figure 3A:
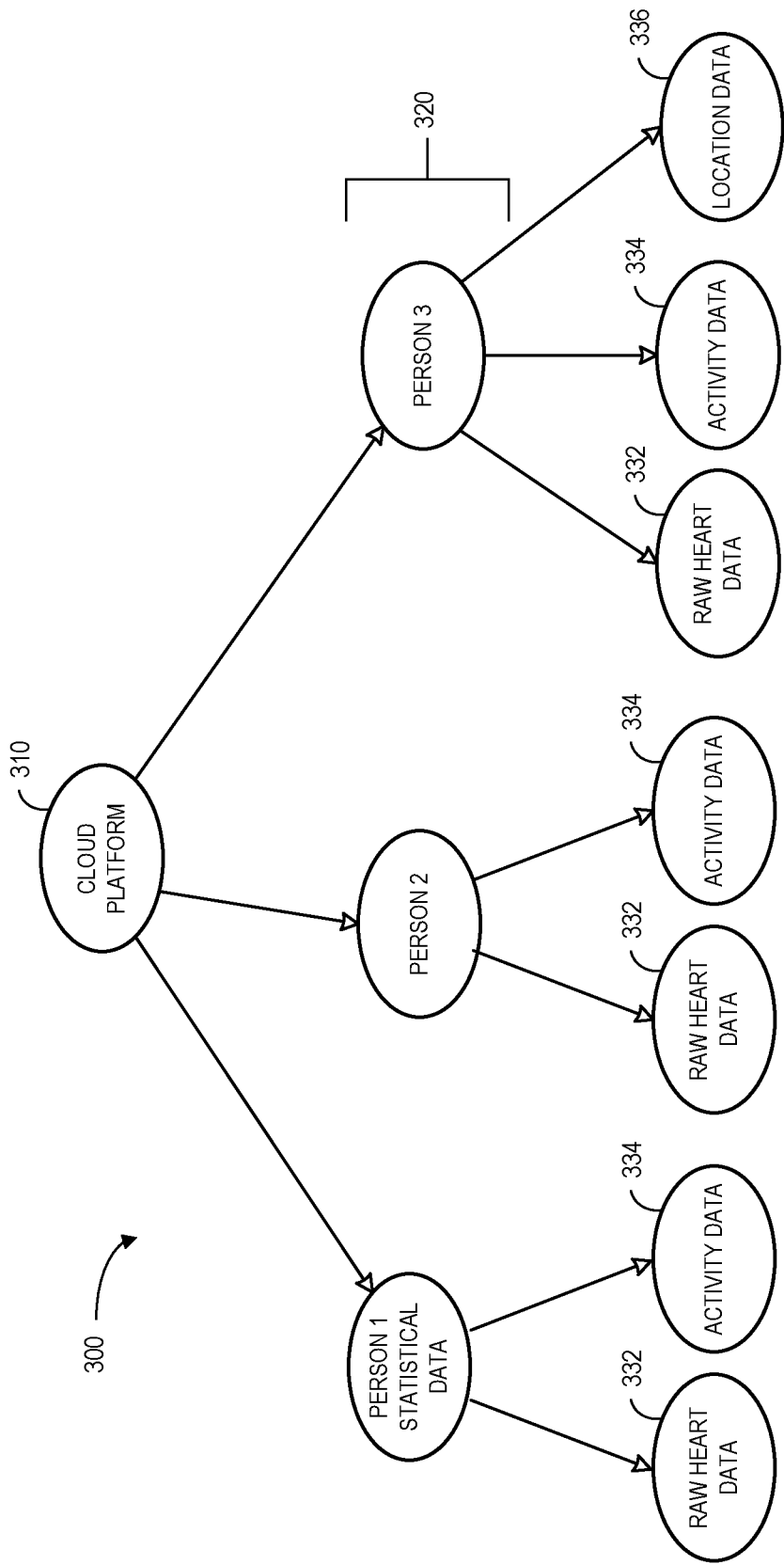
FIGS. 3A and 3B are examples of hierarchical data monetization in accordance with some embodiments.
Figure 3B:
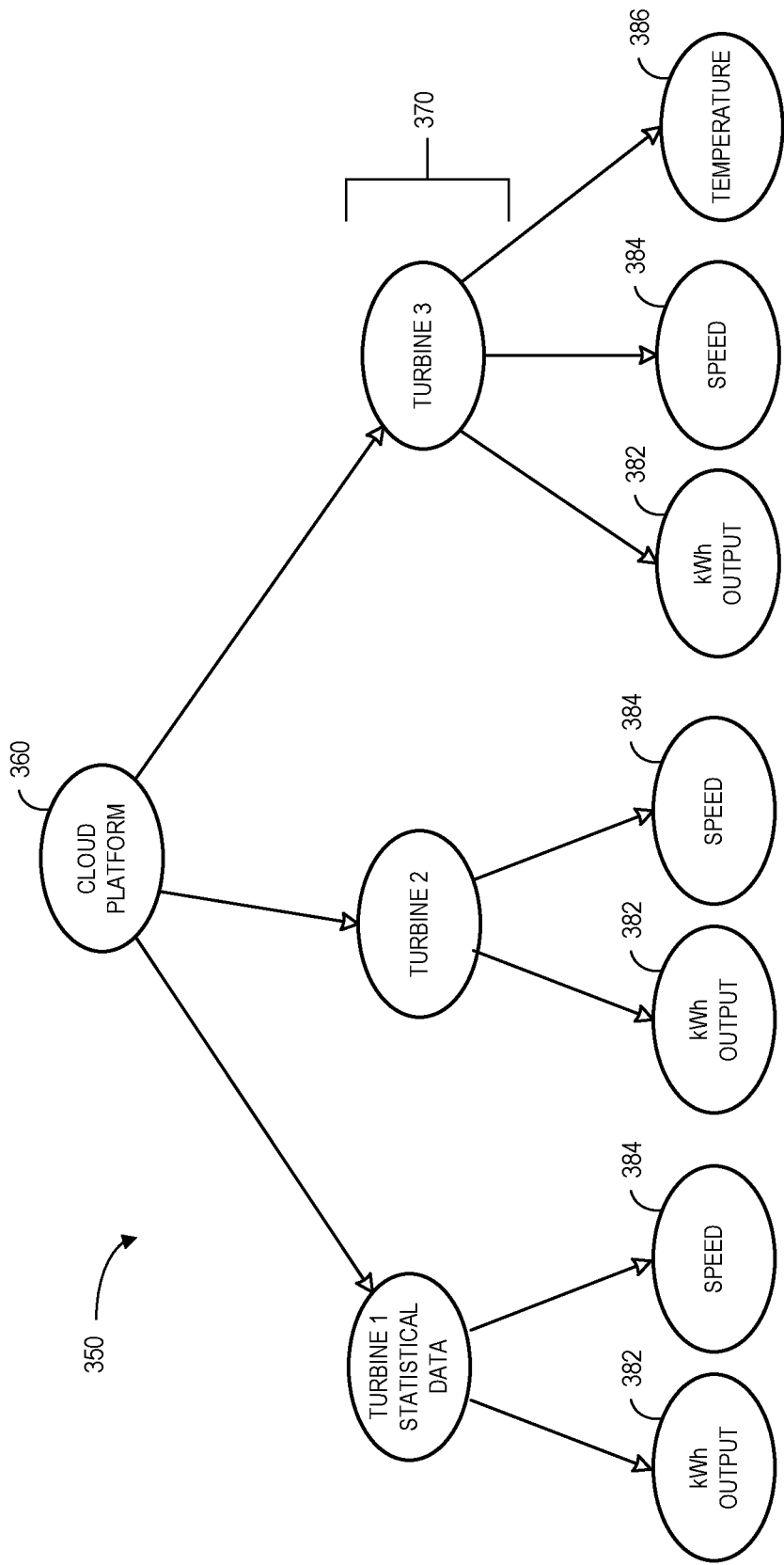

In this way, a hierarchy of information might be made available and/or monetized by a data aggregation platform. For example, FIG. 3A illustrates 300 hierarchical data monetization in accordance with some embodiments. In particular, a cloud platform 310 (e.g., associated with a data aggregation platform or website aggregator) might be able to access a substantial amount of information (e.g., including statistical data) associated with various people 320. For each person 320, various types of detailed information might be available. As illustrated in FIG. 3A, raw heart data 332 and activity data 334 might be available for person 1 and person 2. Note that different people 320 might be associated with different levels or types of data (e.g., either because of personal preference or the use of different data collection devices). For example, person 3 might have decided to make his or her location data 336 available in addition to the raw heart data 332 and activity data 334. As another example, FIG. 3B illustrates 350 hierarchical data monetization in accordance with some embodiments. In particular, a cloud platform 360 (e.g., associated with a website aggregator) might be able to access a substantial amount of information (e.g., including statistical data) associated with various gas or wind turbines 370. For each turbine 370, various types of detailed information might be available. As illustrated in FIG. 3B, kilo-Watt-hours (kWh) output 382 and turbine speed 384 might be available for turbine 1 and turbine 2. Note that different turbines 370 might be associated with different levels or types of data (e.g., either because of the preference or a business operating the turbines 370 or the use of different sensor nodes). For example, turbine 3 might have temperature data 386 available in addition to the kWh output 382 and turbine speed data 384.

Figure 4:
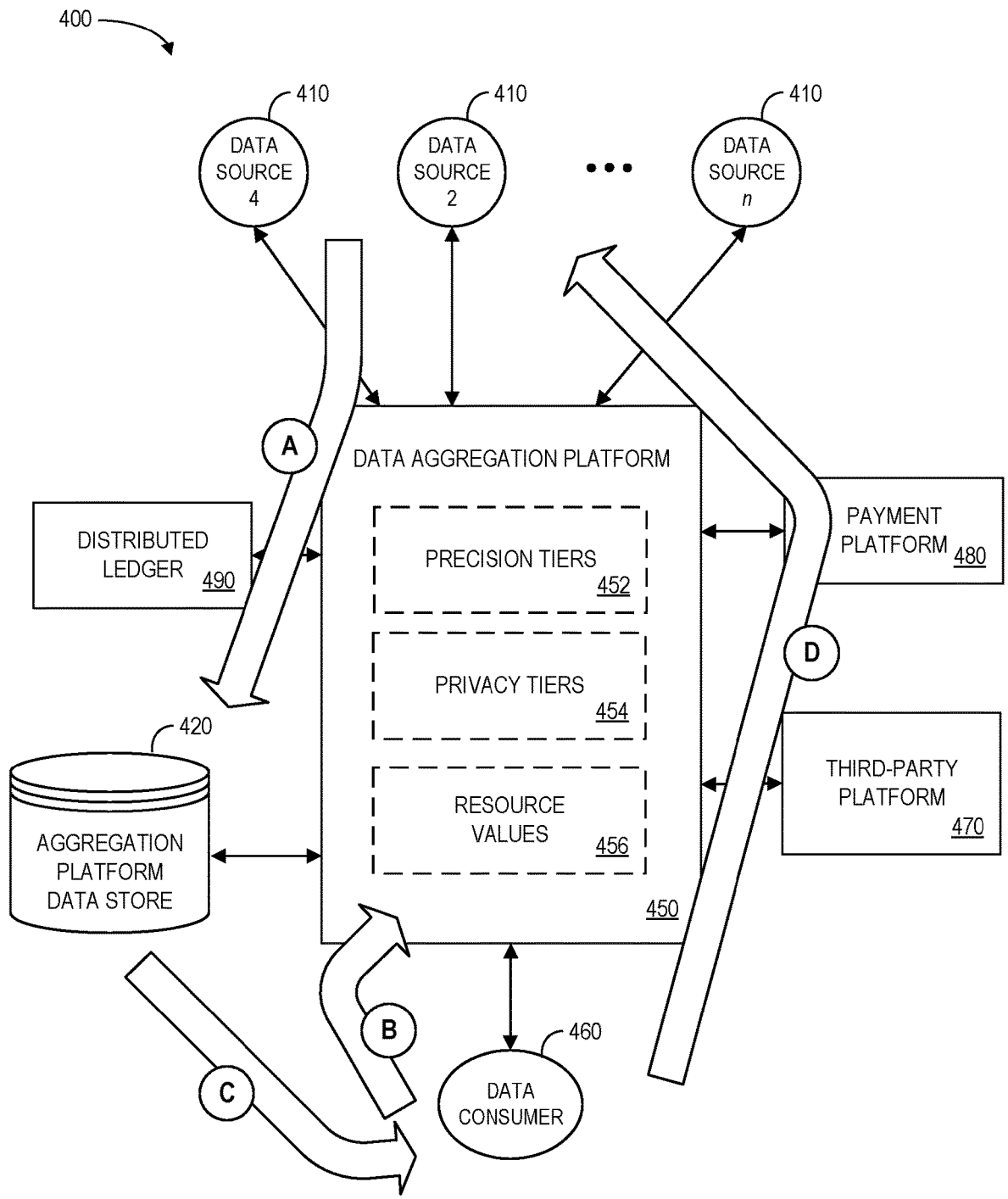
FIG. 4 is a more detailed view of a system according to some embodiments.

FIG. 4 is a more detailed view of a system 400 according to some embodiments. As before, the system 400 includes an automated data aggregation platform 450 that communicates with one or more data sources 410 (e.g., data sources 1 through n) and one or more data consumers 460. By way of example only, the data sources 410 might comprise consumers who wear health monitoring devices and the data consumers 460 might comprise devices associated with medical researchers or insurance companies who are interested in the data generated by the health monitoring devices. At (A), the automated data aggregation platform 450 arranges for information from the data sources 410 to be stored into an aggregation platform data store 420.

At (B), the data aggregation platform 450 receives a data request from a data consumer 460. In accordance with some embodiments, the data aggregation platform 450 may access precision tiers 452, privacy tier 454, and resource values 456 when responding to the request. For example, a data consumer 460 might arrange to provide a higher value to the data aggregation platform 450 in exchange for access to more precise information about the data sources 410 (along with personal information) as compared to less precise (and less personal) information. The data aggregation platform 450 may then modify information in the aggregation platform data store 420 (e.g., by filtering data, taking average values, etc.) and provide the modified information to the data consumer 460 at (C).

According to some embodiments, information from a third-party platform 470 might be used to supplement or modify the information before it is provided to the data consumer 460. For example, the third-party platform 470 might add information about a person's income to records in the aggregation platform data store 420. After the information is provided to the data consumer 460, the data aggregation platform 450 might utilize a payment platform 480 (e.g., a credit card or banking application) to arrange for the data consumer 460 to provide payment and/or for one or more data sources 410 to receive payment in exchange for sharing information. Moreover, information about the transaction might be recorded in a secure, distributed ledger (e.g., via blockchain technology). For example, information about the transaction that might be recording in a secure, distribute ledger includes information about the data request from the data consumer, optionally modified by a precision tier and/or privacy tier, payment information, data integrity information, etc.

Thus, the data aggregation platform 450 may be associated with data that can be described with different levels of fidelity and/or abstraction. A data source 410 may choose to sell high fidelity data—for example, their heart rate at high sample rate. From this data, it might be discernible that the person has an irregular heart rate—which an insurer could use to classify them as a "high risk" individual. As a result, this high-fidelity data might be very valuable to the insurer. Another data consumer 460 may not be interested in the high sample rate data, but would instead be interested in average heart rates of groups of people—for example, to determine a general level of health. Those data sources 410 contributing data at this level of fidelity can also be compensated, but perhaps at a reduced rate as compared to those who contribute higher fidelity data. Note that the data aggregation platform 450 and/or distributed ledger 490 may allow for the provenance, integrity, and/or confidentiality of hierarchical data using blockchain technology).

The data aggregation platform 450 may provide a means for a data source 410 to be remunerated for increasingly detailed information—with higher fidelity (and more private) information being assessed at a higher value than lower granularity (e.g., averages or aggregated sets of data. According to some embodiment, the distributed ledger 490 may be used to:

facilitate payment transactions between data sources 410 and data consumers 460;
publish availability of data and/or associated options for granularity and data quality;
establish a tiered pricing model for data;
control access to data at agreed upon granularity;
establish authenticity and/or provenance of data; and
federate data and link to the aggregation platform data store 420.

Figure 5:
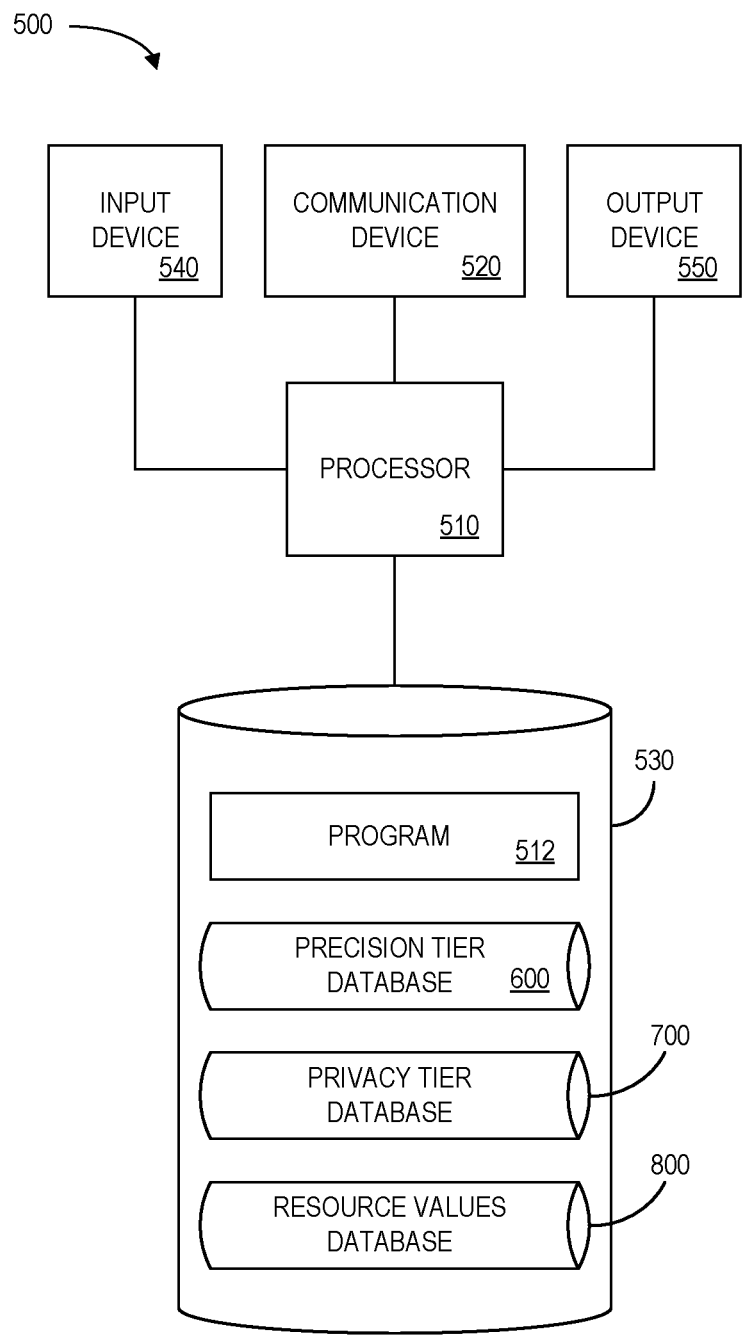
FIG. 5 illustrates a platform according to some embodiments.

In this way, embodiments described herein may comprise a tool that facilitates hierarchical data monetization and may be implemented using any number of different hardware configurations. For example, FIG. 5 illustrates a platform 500 that may be, for example, associated with the systems 100, 400 of FIGS. 1 and 4, respectively (as well as other systems described herein). The platform 500 comprises a processor 510, such as one or more commercially available Central Processing Units ("CPUs") in the form of one-chip microprocessors, coupled to a communication device 520 configured to communicate via a communication network (not shown in FIG. 5). The communication device 520 may be used to communicate, for example, with one or more remote data sources and/or data consumers. Note that communications exchanged via the communication device 520 may utilize security features, such as those between a public internet user and an internal network of an insurance enterprise. The security features might be associated with, for example, web servers, firewalls, and/or PCI infrastructure. The platform 500 further includes an input device 540 (e.g., a mouse and/or keyboard to enter information about a data source, a data hierarchy, pricing information, etc.) and an output device 550 (e.g., to output system reports, generate data monetization dashboards, etc.).

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 and/or network security service tool or application for controlling the processor 510. The processor 510 performs instructions of the program 512, and thereby operates in accordance with any of the embodiments described herein. For example, the processor 510 may facilitate hierarchical data exchange by collecting, from a plurality of data source devices, information associated with a plurality of data sources. The processor 510 may also receive a data request from a data consumer device, and, responsive to the received data request, determine a precision tier associated with the data request. The processor 510 may then automatically calculate a resource value for the data request based on the precision tier. It may then be arranged by the processor 510 for information from the aggregation platform data store to be modified and transmitted to the data consumer device.

The program 512 may be stored in a compressed, uncompiled and/or encrypted format. The program 512 may furthermore include other program elements, such as an operating system, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

In some embodiments (such as shown in FIG. 5), the storage device 530 further stores a precision tier database 600, privacy tier database 700, and resource values database 800. Examples of databases that might be used in connection with the platform 500 will now be described in detail with respect to FIGS. 6 through 8. Note that the databases described herein are only examples, and additional and/or different information may be stored therein. Moreover, various databases might be split or combined in accordance with any of the embodiments described herein. For example, precision tier database 600 and the privacy tier database 700 might be combined and/or linked to each other within the program 512.

Referring to FIG. 6, a table is shown that represents the precision tier database 600 that may be stored at the platform 500 in accordance with some embodiments. The table may include, for example, entries identifying different levels of data granularity or specificity. The table may also define fields 602, 604, 606 for each of the entries. The fields 602, 604, 606 may, according to some embodiments, specify: a precision tier identifier 602, precision tier description 604, and resource value 606. The precision tier database 600 may be created and updated, for example, based on information electrically received from data sources, a data aggregation platform administrator, etc.

The precision tier identifier 602 may be, for example, a unique alphanumeric code identifying a level of data granularity or specificity. The precision tier description 604 may described the level of data granularity or specificity associated with data in that tier (e.g., from the most specific "hourly heart rate" to the least specific "overall lifetime average heart rate"). The resource value 606 might represent, for example, a monetary value or some other benefit that might be provided by a data consumer and/or provided to a data source. Note that more specific data might be associated with higher resource values 606.

Referring to FIG. 7, a table is shown that represents the privacy tier database 700 that may be stored at the platform 500 in accordance with some embodiments. The table may include, for example, entries identifying levels of personal information associated with data. The table may also define fields 702, 704, 706 for each of the entries. The fields 702, 704, 706 may, according to some embodiments, specify: a privacy tier identifier 702, privacy tier description 704, and a resource value 706. The privacy tier database 700 may be created and updated, for example, based on information electrically received from data sources, a data aggregation platform administrator, etc.

The privacy tier identifier 702 may be, for example, a unique alphanumeric code identifying a level of personal information and may be based on or associated with the privacy tier identifier 802 in the resource values database 800. The privacy tier description 704 may describe the level of personal information associated with data in that tier (e.g., from the most personal "exact name/SSN" to the least personal "no information"). The resource value 706 might represent, for example, a monetary value or some other benefit that might be provided by a data consumer and/or provided to a data source. Note that more personal data might be associated with higher resource values 706.

Referring to FIG. 8, a table is shown that represents the resource values database 800 that may be stored at the platform 500 in accordance with some embodiments. The table may include, for example, entries identifying different resource values that are assigned to various levels of precision and/or privacy. The table may also define fields 802, 804, 806 for each of the entries. The fields 802, 804, 806 may, according to some embodiments, specify: a privacy tier identifier 802, a privacy tier description 804, and resource values 806 for various precision levels. The resource values database 800 may be created and updated, for example, based on information electrically received from data sources, data providers, a data aggregation platform administrator, etc.

The privacy tier identifier 802 may be, for example, a unique alphanumeric code identifying a level of personal information and may be based on or associated with the privacy tier identifier in the privacy tier database 700. The privacy tier description 804 may describe the level of personal information associated with data in that tier (e.g., including a lower level of personal information "age band or birthday" and a relatively higher level of personal information "gender"). The resource values 808 might be specified for each of a number of different levels of data precision. That is, the resource values 808 might represent a matrix of benefit that might be provided with more precise and/or more personal data being associated with higher benefit as compared to less precise and/or less personal data.

Figure 9:
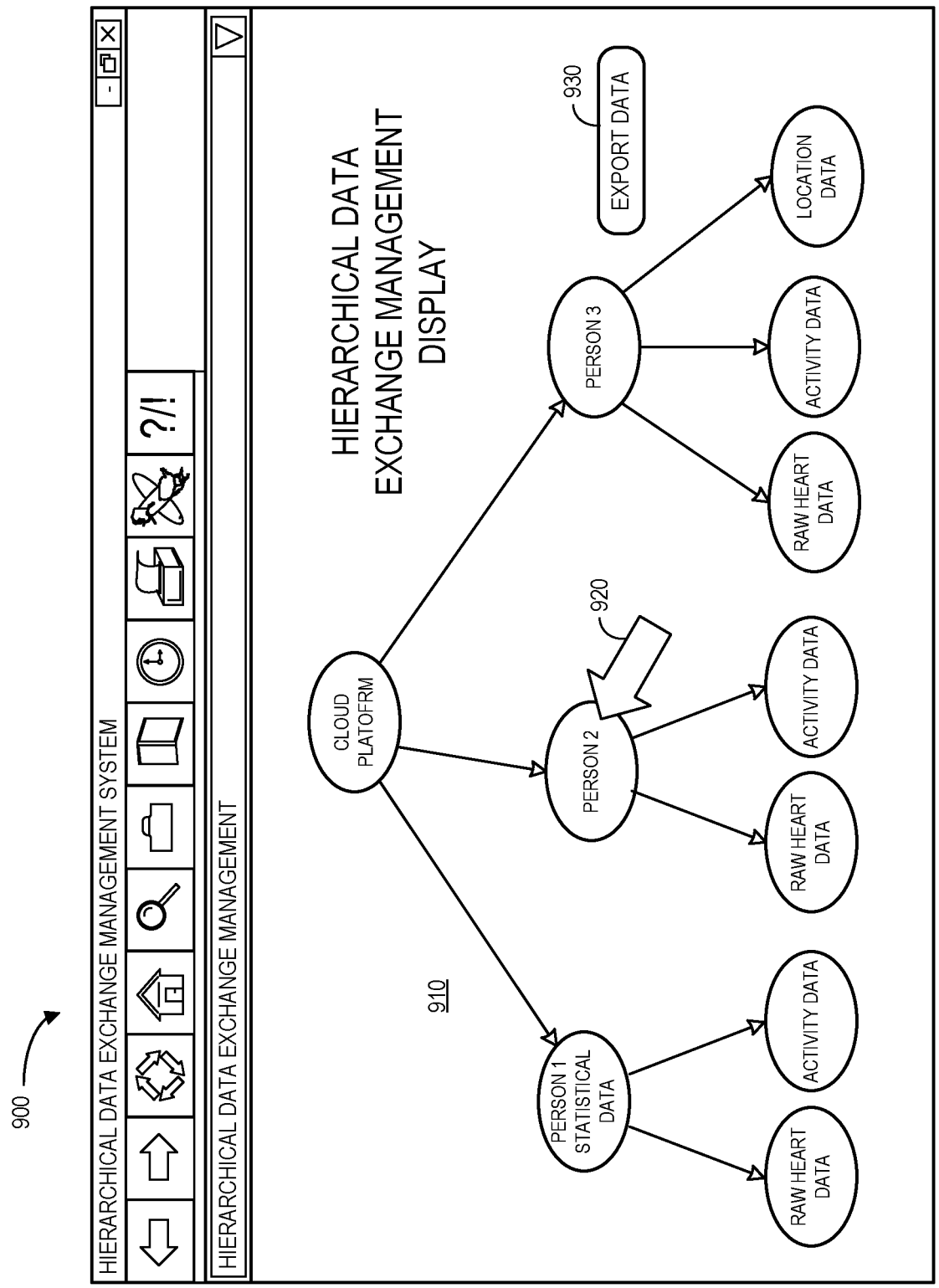
FIG. 9 illustrates an interactive user interface display according to some embodiments.

The information in the precision tier database 600, privacy tier database 700, and/or resource values database 800 might be monitored and/or updated by a data aggregation platform administrator. For example, FIG. 9 illustrates an interactive user interface display 900 according to some embodiments. The display 900 includes a data hierarchy graphical user interface 910 including a cloud platform (e.g., a website aggregator), statistical data for various people, and specific types of data elements. According to some embodiments, selection of an element in the interface 910 (e.g., via a computer mouse pointer 920 or touch screen) results in further information about that element being displayed (e.g., an associated resource value might be displayed in a pop-up window and/or adjusted by an administrator). Selection of an "Export Data" icon might, according to some embodiments, result in a transfer of data from a data source to a data consumer.

Figure 10:
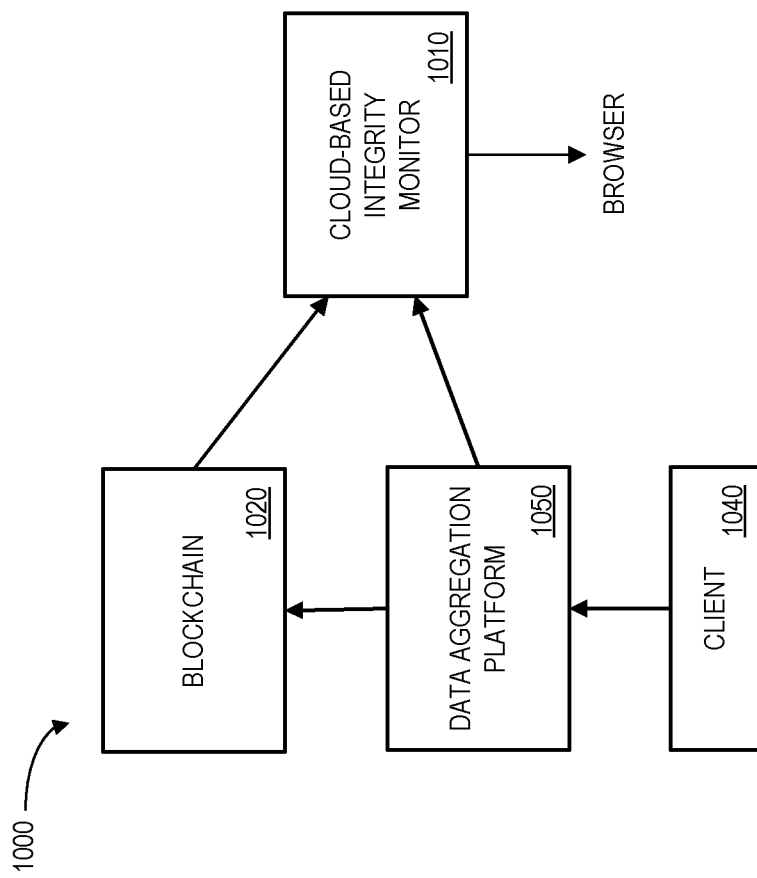
FIG. 10 is a system implementing hierarchical data monetization transactions with blockchain validation according to some embodiments.
Figure 11:
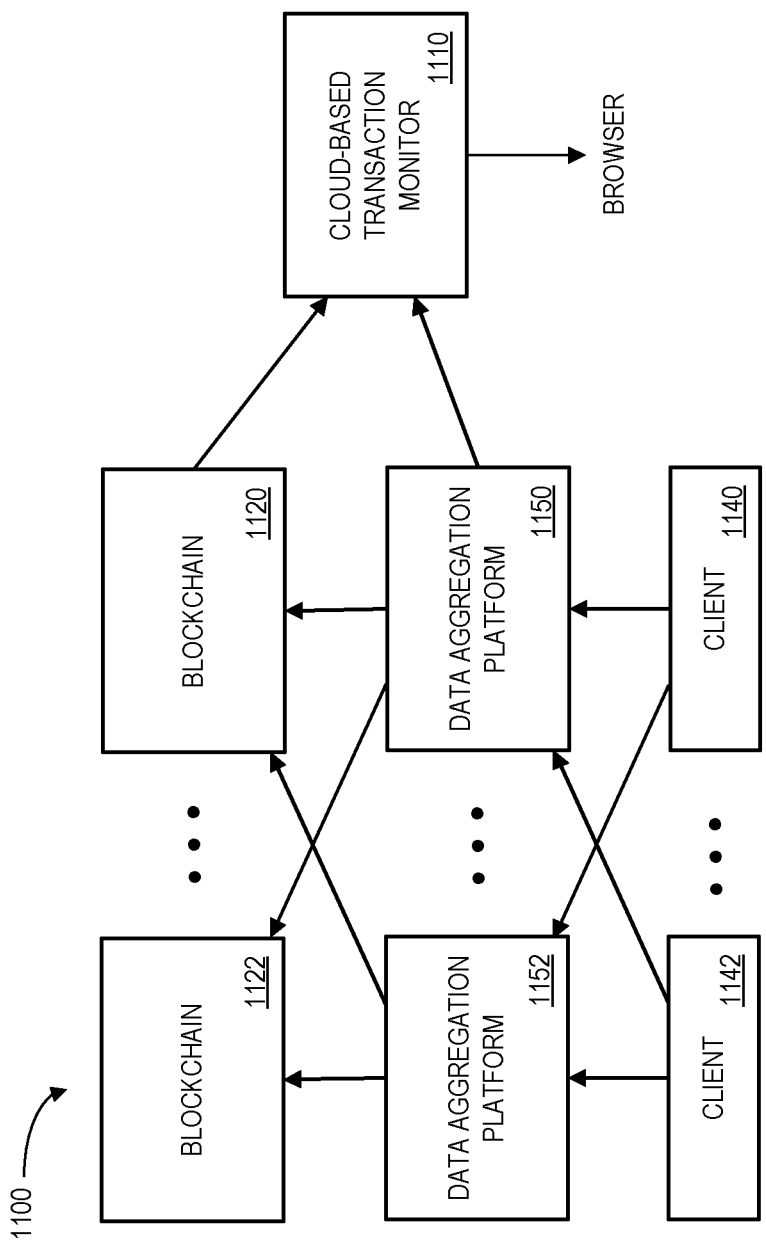
FIG. 11 is a system implementing hierarchical data monetization transactions with multiple data aggregation platforms in accordance with some embodiments.

A data aggregation platform and/or other elements of a data hierarchy monetization system may record information about transactions using a secure, distributed transaction ledger (e.g., via a blockchain verification process). For example, the data aggregation platform might record a request date and time, a data description, a data source identifier, a price, a bid, etc. via the secure, distributed transaction ledger in accordance with any of the embodiments described herein. According to some embodiments, the distributed ledger might be associated with the HYPERLEDGER® blockchain verification system. FIG. 10 is a system 1000 implementing hierarchical data monetization transactions incorporating blockchain validation according to some embodiments. A cloud-based integrity monitor 1010 may provide transaction integrity data via a web browser and exchange information with a blockchain 1020 (or other secure distributed transaction ledger) and a data aggregation platform 1050 via Representational State Transfer ("REST") web services or other similar web services. The REST web services may, for example, provide interoperability between computer systems on the Internet (e.g., by allowing requesting systems to access and manipulate textual representations of web resources using a uniform, predefined set of stateless operations). According to some embodiments, portions of the data aggregation platform 1050 may be associated with database, such as a MySQL database. In this way, the data aggregation platform 1050 and blockchain 1020 can be used to provide transaction level verification for a client 1040 (including, for example, information about one or more hierarchical data transactions). Although FIG. 10 illustrates a system 1000 with a single blockchain 1020 and data aggregation platform 1050, note that embodiments may employ other topologies. For example, FIG. 11 is a system 1100 implementing a hierarchical data monetization transaction incorporating multiple data aggregation platforms 1150, 1152 in accordance with some embodiments. In particular, an additional blockchain 1122 and data aggregation platform 1152 may provide protection for an additional client 1142. As illustrated in FIG. 11, each data aggregation platform 1150, 1152 may be associated with multiple blockchains 1120, 1122 providing additional protection for the system 1100 (e.g., by storing information at multiple, geographically disperse nodes making attacks impractical). That is, each verifier (e.g., data aggregation platform 1150, 1152) may commit a brief summary to an independent data store (including for example, information about hierarchical data transaction) and, once recorded, the information cannot be changed without detection to provide a tamper-proof System of Records ("SoR").

Figure 12:
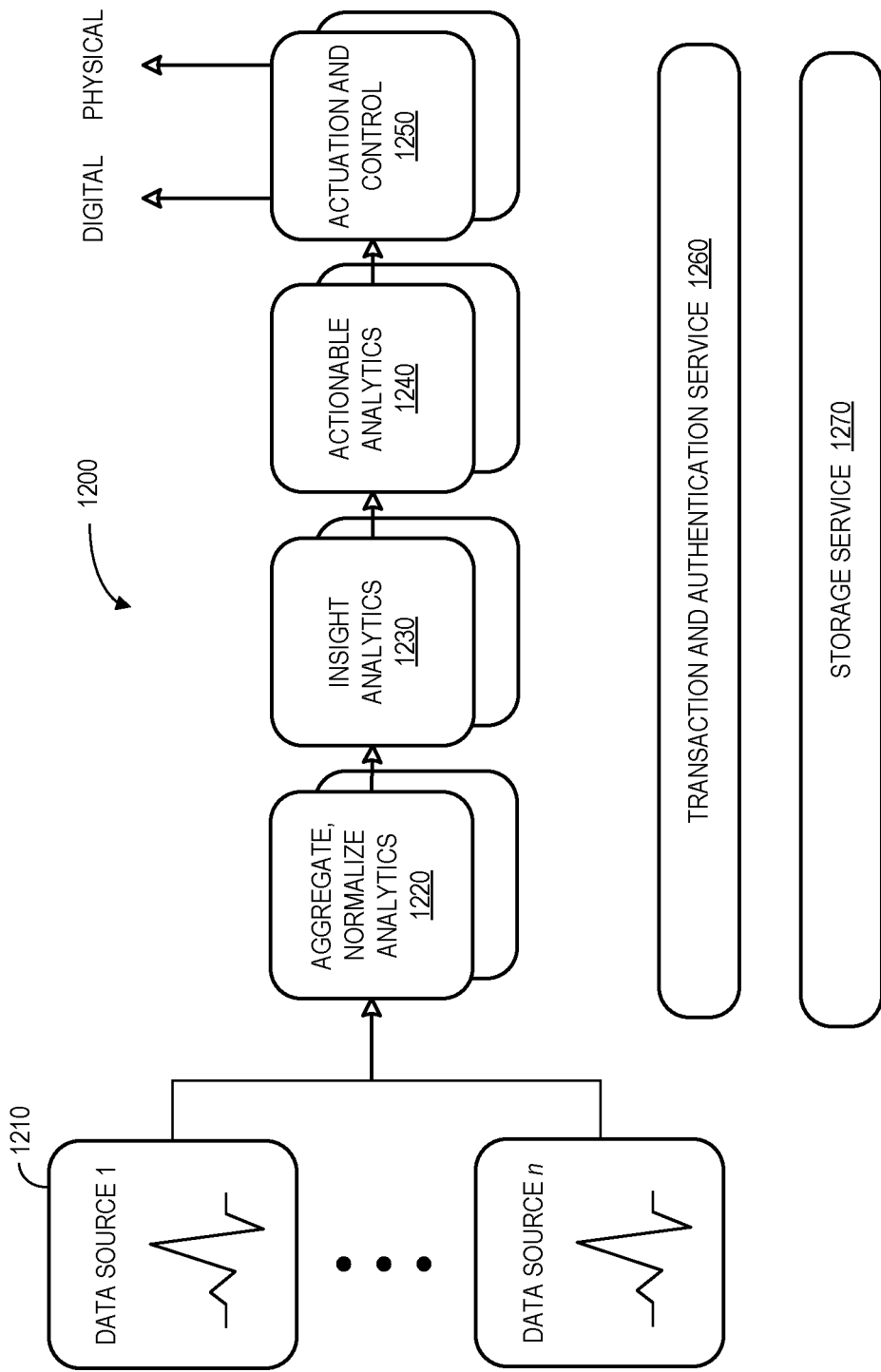
FIG. 12 is a data supply chain for data markets according to some embodiments.

FIG. 12 is a data supply chain 1200 for data markets according to some embodiments. Information from various data sources 1210 (data source 1 through n) may be aggregated and/or normalized via analytics 1220. Application of insight analytics 1230 may result in actionable analytics 1240 that can be implemented via actuation and control processes 1250 (e.g., including both digital and physical implementations). For example, one or more components of the data supply chain 1200 might request information that has been generated by the data sources 1210 (e.g., the component that looks for actionable analytics 1240 might act as a data consumer who requests data associated with specific precision and pricing levels). Such transactions may be recorded via a transaction and authentication service 1260 (e.g., utilizing blockchain) and/or retained in a storage service 1270. Note that transactions providing information from a data source 1210 to a data consumer might be implemented in a number of different ways, including, for example: a per use or limited use license (e.g., of data generated by one or more data sources 1210), a sell-out license, a sub-license right, etc. Moreover, embodiments might utilize supply chain factoring, incremental upgrades, and/or anonymized data and transactions. Information may be traceable and/or auditable back to an original source (e.g., data source 1210) and, in some embodiments, be tagged through an entire chain, tree, or mesh associated with the transaction. Automated rules and/or processes, including a pre-programmed bot, might be used to negotiate prices between data sources 1210 and data consumers (e.g., prices associated with various precision and privacy levels). In some cases, parameterized and/or machine learning might facilitate such negotiations. Note that data values (e.g., ranging from a free give away to substantial monetization) might be based on various factors including data compression, distance from a data source 1210, copyright as a service, etc.

The information associated with transactions in the supply chain 1200 might, for example, represent three-dimensional printing files (e.g., for additive manufacture), optical displays, audio streams, etc. Moreover, various components of the supply chain 120 could provide additional services, such as certification, authentication (with blockchain being only one option among many), license rights services, quality control, use control and restrictions, anti-counterfeit measures, etc.

Figure 13:
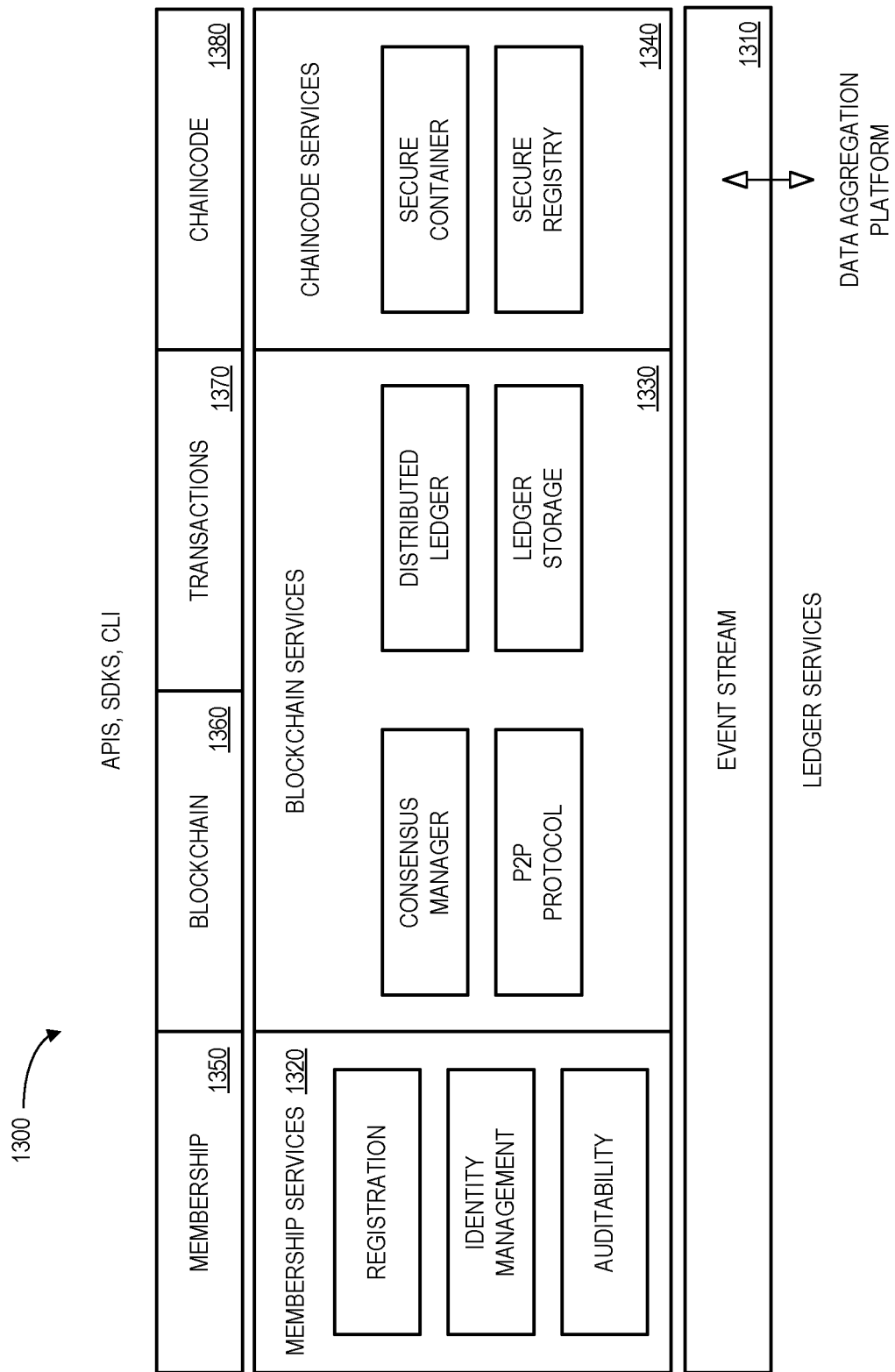
FIG. 13 is a distributed ledger reference architecture according to some embodiments.

The transaction and authentication service 1260 might, according to some embodiments, be associated with any type of distributed ledger having a de-centralized consensus-based network that supports smart contracts, digital assets, record repositories, and/or cryptographic security. For example, FIG. 13 is a distributed ledger reference architecture 1300 according to some embodiments. The architecture 1300 includes ledger services and an event stream 1310 that may contain hierarchical data transaction information (e.g., from a data aggregation platform). Membership services 1320 (e.g., including registration, identity managements, and/or an auditability process) may manage identity, privacy, and confidentiality for membership 1350 for the network security service. Blockchain services (e.g., including a consensus manager, Peer-to-Peer ("P2P") protocol, a distributed ledger, and/or ledger storage) may manage the distributed ledger, for example, through a P2P protocol to maintain a single state that replicated at many nodes to support blockchains 1360 and transactions 1370. Chaincode services 1340 (e.g., secure container and/or a secure registry associated with a smart contract) may help compartmentalize smart contract (or chaincode 1380) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1300. The information recorded via the architecture 1300 might include, for example, data request information, data source information, payment information, data integrity information, precision information, privacy information, resource value information, indications of data availability, etc.

Thus, some embodiments described herein may provide technical advantages and help solve an "all or nothing" problem where data is shared in full or not shared at all (which can limit a person's willingness to share data and also limit the development of data markets where different price points are required or desired for different levels of disclosure). Moreover, embodiments may democratize a data market and dis-intermediate a data aggregator that currently monopolize the market place. Through the creation of multi-tier pricing models, and technologies that manage access to increasingly higher fidelity data, a payment mechanism may be established that mutually benefits multiple parties—data buyers and sellers, data sources, data consumers, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
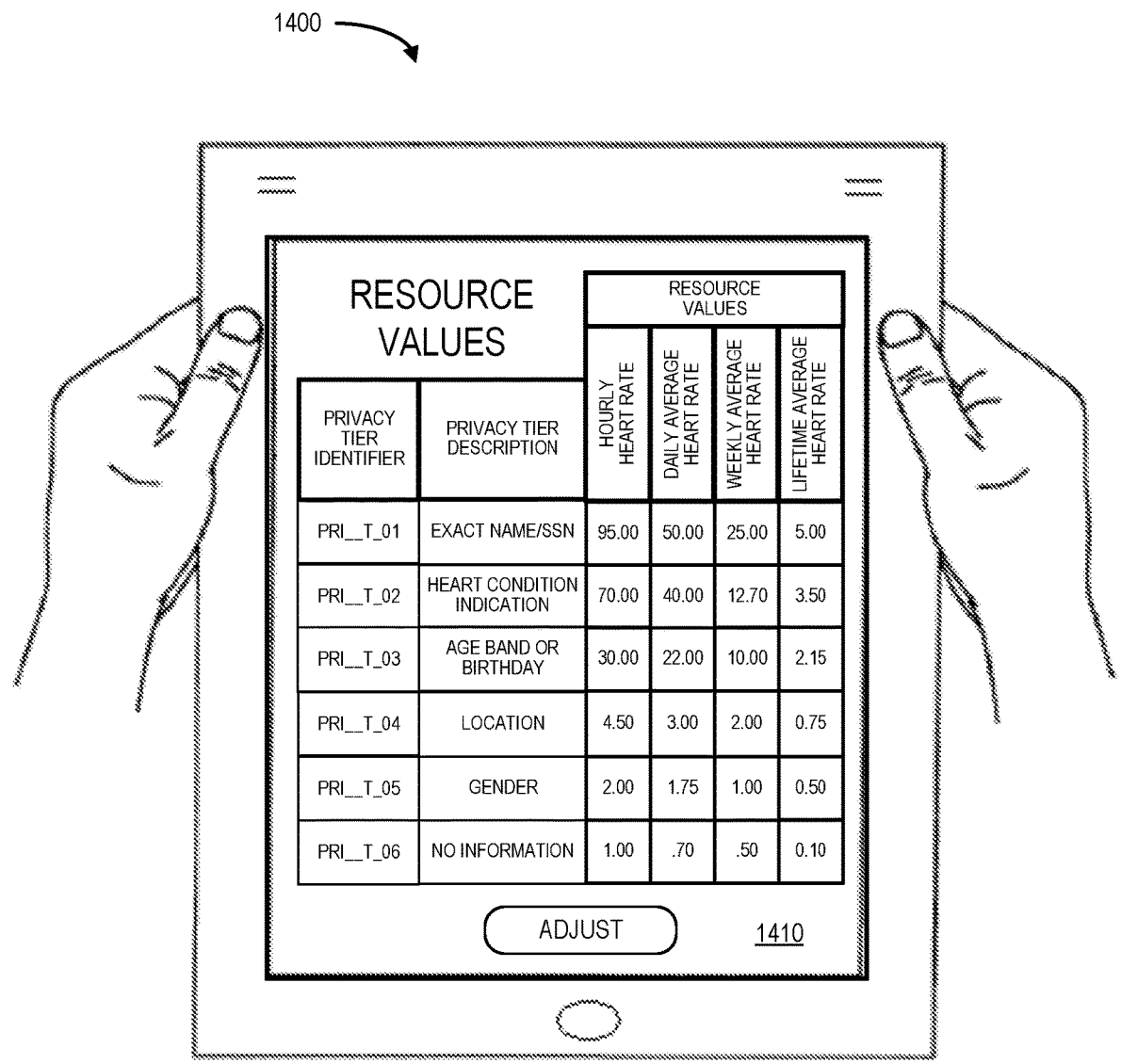
FIG. 14 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to specific types of data, note that embodiments might be associated with other types of data, including streaming entertainment, three-dimensional models, etc. Similarly, the displays shown and described herein are provided only as examples, and other types of displays and display devices may support any of the embodiments. For example, FIG. 14 illustrates a tablet computer 1400 with an interactive resource value display 1410 that might utilize a graphical user interface. The display 1410 might comprise matrix of prices associated with various levels of precision and/or privacy. Note that selection of an element on the display 1410 might result in a display of further information about that element. Moreover, the display 1410 might comprise an interactive user interface (e.g., via a touchscreen) and include an "Adjust" 1420 icon to let an operator or administrate change various tiers and/or prices points in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
a data aggregation platform comprising:
a communication port; and
a data aggregation computer processor coupled to the communication port, wherein the data aggregation computer processor is adapted to:
access an aggregation platform data store containing collected data items associated with a plurality of data sources;
receive a data request from a data consumer device, and
responsive to the received data request, determine a precision tier associated with the data request, wherein the precision tier is associated with a level of detail of the data items from the plurality of data sources, and wherein the precision tier is associated with a plurality of data items collected over a period of time.

2. The system of claim 1, wherein the data aggregation computer processor is adapted to record information associated with the data request via a secure, distributed transaction ledger comprising blockchain technology.

3. The system of claim 1, wherein the data aggregation computer processor is adapted to automatically calculate a resource value for the data request based on the precision tier.

4. The system of claim 3, wherein the data aggregation computer processor is adapted to determine a privacy tier associated with the data request and data related to an identity of one of the plurality of data sources, wherein the automatically calculated resource value is further based on the privacy tier.

5. The system of claim 3, wherein the resource value is associated with a benefit provided to the plurality of data sources in exchange for providing the information.

6. The system of claim 1, wherein the plurality of data sources comprises individuals.

7. The system of claim 1, wherein the collected data items are associated with demographic data, psychographic data, location data, telematic data, survey data, genetic data, credit score data, spending data, credit card data, bank account data, health data, media consumption data, or communication data, wherein:
health data includes at least one of heart rate data, activity data, sleep data, blood pressure data, glucose monitoring data, and insulin data;
media consumption data includes at least one of television data, online data, application data, streaming data, advertising data; and
communication data includes at least one of telephone communication data, email communication data, social network communication data, and real world proximity data.

8. The system of claim 1, wherein the data sources comprise business entities and the collected data items are associated with at least one of: sales data, profit data, employee data, debt data, an industrial asset item, a digital twin, and an additive manufacturing process.

9. The system of claim 1, wherein the level of detail of the precision tier is associated with at least one of: a data set comprising multiple data items of a single type associated with one data source of the plurality of data sources, an average of multiple data items associated with multiple data sources of the plurality of data sources, and data items sharing at least one characteristic specified in the data request.

10. The system of claim 1, wherein the data aggregation computer processor is adapted to modify the collected data items by at least one of: data aggregation, averaging multiple data items associated with a single data source, averaging multiple data items associated with multiple data sources, combining data items from multiple data sources of the plurality of data sources, removing information, supplementing data items with third-party data, and data translation.

11. A system, comprising:
a data aggregation platform comprising:
a communication port; and
a data aggregation computer processor coupled to the communication port, wherein the data aggregation computer processor is adapted to:
access an aggregation platform data store containing collected data items associated with a plurality of data sources;
receive a data request from a data consumer device;
responsive to the received data request, determine a precision tier associated with the data request, wherein the precision tier is associated with a level of detail of the data items from the plurality of data sources; and
calculate a resource value for the data request based on the precision tier.

12. The system of claim 11, wherein the data aggregation computer processor is adapted to determine a privacy tier associated with the data request and data related to an identity of one of the plurality of data sources.

13. The system of claim 11, wherein the calculated resource value is further based on the privacy tier.

14. The system of claim 11, wherein the data aggregation computer processor is further adapted to arrange for at least a portion of the resource value to be provided to at least one data source.

15. The system of claim 11, wherein the resource value is associated with a benefit provided to the plurality of data sources in exchange for providing the information.

16. A computer-implemented method, comprising:
- receiving, at a data aggregation computer processor, a data request from a data consumer device;
- accessing, by the data aggregation computer processor, an aggregation platform data store containing collected data items associated with a plurality of data sources;
- responsive to receiving the data request, determining, by the data aggregation computer processor, a precision tier associated with the data request, wherein the precision tier is associated with a level of detail of the information from the plurality of data sources; and
- calculating, by the data aggregation computer processor, a resource value for the data request based on the precision tier.

17. The computer-implemented method of claim 16, comprising recording information associated with the data request via a secure, distributed transaction ledger comprising blockchain technology.

18. The computer-implemented method of claim 17, comprising determining a privacy tier associated with the data request and data related to an identity of one of the plurality of data sources, and wherein the calculated resource value is further based on the privacy tier.

19. The computer-implemented method of claim 18, wherein the collected information is associated with health data and includes at least one of: heart rate data, activity data, sleep data, blood pressure data, glucose monitoring data, and insulin data.

20. The computer-implemented method of claim 16, wherein the precision tier is associated with a plurality of data items collected over a period of time.

* * * * *